(12) United States Patent
Stiesdal

(10) Patent No.: US 12,540,601 B2
(45) Date of Patent: Feb. 3, 2026

(54) METHOD OF ASSEMBLY AND INSTALLATION OF AN OFFSHORE SUPPORT STRUCTURE FOR A WIND TURBINE

(71) Applicant: Stiesdal Offshore A/S, Give (DK)

(72) Inventor: Henrik Stiesdal, Odense (DK)

(73) Assignee: Stiesdal Offshore A/S, Give (DK)

( * ) Notice: Subject to any disclaimer, the term of this patent is extended or adjusted under 35 U.S.C. 154(b) by 83 days.

(21) Appl. No.: 18/679,785

(22) Filed: May 31, 2024

(65) Prior Publication Data

US 2024/0318634 A1    Sep. 26, 2024

Related U.S. Application Data

(63) Continuation of application No. PCT/DK2022/050234, filed on Nov. 9, 2022.

(30) Foreign Application Priority Data

Dec. 14, 2021   (DK) ............................ PA 2021 01194

(51) Int. Cl.
| | |
|---|---|
| *E02D 27/52* | (2006.01) |
| *E02B 17/00* | (2006.01) |
| *E02D 27/42* | (2006.01) |
| *F03D 13/10* | (2016.01) |

(52) U.S. Cl.
CPC ........ *F03D 13/112* (2023.08); *E02B 17/0008* (2013.01); *E02D 27/425* (2013.01); *E02D 27/52* (2013.01); *F03D 13/126* (2023.08); *E02B 17/0004* (2013.01); *E02B 2017/0039* (2013.01); *E02B 2017/0091* (2013.01); *F05B 2230/61* (2013.01); *F05B 2240/95* (2013.01)

(58) Field of Classification Search
CPC .. F03D 13/112; F03D 13/116; E02B 17/0008; E02B 17/0004; E02B 2017/0039; E02B 2017/0091; F05B 2230/61; F05B 2240/95
See application file for complete search history.

(56) References Cited

U.S. PATENT DOCUMENTS

| | | | |
|---|---|---|---|
| 4,000,624 A | 1/1977 | Chow | |
| 4,245,928 A | 1/1981 | Jo et al. | |
| 4,557,629 A * | 12/1985 | Meek | E02B 17/027 405/195.1 |

(Continued)

FOREIGN PATENT DOCUMENTS

| | | |
|---|---|---|
| ES | 2496390 A1 | 9/2014 |
| JP | 2000087504 A | 3/2000 |
| WO | 2011147472 A1 | 12/2011 |

*Primary Examiner* — Kyle Armstrong
(74) *Attorney, Agent, or Firm* — Elevated IP, LLC

(57) ABSTRACT

In the assembly of the support structure of a wind turbine, N sets of a first tubular brace and a second tubular brace extend from a tower support. For each set, the second braces are connected at one or both of their end parts by a casted connection. The first brace or the tower structure has a casting cavity for accommodating an end of the corresponding second brace. In order to assemble the construction, the second brace is inserted into the cavity, after which the end of the first brace is lifted until the end of the second brace is inserted deeply enough into the respective cavity.

11 Claims, 9 Drawing Sheets

(56) References Cited

U.S. PATENT DOCUMENTS

| | | | | |
|---|---|---|---|---|
| 4,973,199 A | * | 11/1990 | Cox | ............... E02B 17/027 405/203 |
| 5,051,037 A | | 9/1991 | Haney et al. | |
| 5,308,194 A | | 5/1994 | Carruba | |

* cited by examiner

METHOD OF ASSEMBLY AND INSTALLATION OF AN OFFSHORE SUPPORT STRUCTURE FOR A WIND TURBINE

CROSS-REFERENCE TO RELATED APPLICATIONS

This application is a continuation under 35 U.S.C. 111 of International Patent Application No. PCT/DK2022/050234, filed Nov. 9, 2022, which claims the benefit of and priority to Danish Application No. PA 2021 01194, filed Dec. 14, 2021, each of which is hereby incorporated by reference in its entirety.

FIELD OF INVENTION

The present invention relates to methods of assembly and installation of an offshore support structure for a wind turbine.

BACKGROUND

For offshore structures, for example for supporting wind turbines, tetrahedral structures are advantageous for a high degree of stability while on a relative scale requiring only moderate costs. In order to optimize methods of production, including reducing and minimizing production costs, which makes offshore wind energy parks increasingly attractive, there is a steady effort to find improvements in the production procedure.

U.S. Pat. No. 5,051,037 discloses a braced offshore structure that is constructed on land in a compact bundle and after transport to the installation site unfolded and installed on the ocean floor. Due to the unfolding, the braces are connected rotationally by hinges.

Japanese patent application JP2000087504A discloses a method for providing an offshore tower structure, where ends of connecting tubes are inserted through openings into larger braces, and a grout cast fills a portion of the larger brace and an end portion of the tube, which is provided with shear keys for additional stabilization.

U.S. Pat. No. 4,245,928 discloses an offshore structure where piles are driven into the seabed and braces are fastened to the piles in order to provide stability. The braces are connected to the piles in joints that are fixed with cement. WO2011/147472 discloses a segmented jacket construction, in particular for a foundation for a wind turbine installation, which comprises grid segments that are interconnected by joints that comprise tubular modules bonded by a grouted material.

In cases where grid segments are interconnected by grouted connections at one end only, the corresponding segment can be pushed into the receiving cavity, which is later grouted, whereas the opposite end of the grid segment can then be fixed by other means or not fixed at all. This appears at first sight as a straightforward procedure. However, this is not so when the structures are very large, such as for offshore structures carrying modern large wind turbines. In particular, it is difficult if the grid segment has to be fixed by grouted connection at both ends because the segment, typically, cannot be inserted into both cavities at the same time. The problem is reflected in the rather complex construction procedure disclosed in the above-mentioned U.S. Pat. No. 4,245,928.

It would be desirable to provide a construction method for offshore platforms, especially for wind turbines, in which grouted connections are provided at opposite ends of tubular segments but which in a relatively simple way allows assembly. Also, for those assemblies where only one end of the braces is in a grouted connection, it would be desirable to find a way that makes assembly simple and versatile.

BRIEF DESCRIPTION

It is therefore an objective of the present methods to provide an improvement in the art. In particular, it is an objective to provide a construction method for offshore platforms for wind turbines, in particular for tetrahedral structures. This objective and further advantages are achieved by a method of assembling and optionally also installing an offshore support structure for a wind turbine as described below and in the claims.

In short, in the assembly of the support structure of a wind turbine, N sets of a first tubular brace and a second tubular brace extend from a tower support. For each set, the second brace is connected at one or both ends by a casted connection. The first brace or the tower support has a casting cavity for accommodating an end of the corresponding second brace. In order to assemble the construction, the second brace is inserted into the cavity, after which the end of the first brace is lifted until the end part of the second brace is inserted deeply enough into the respective cavity.

Details are explained in the following.

For the assembly, a first set of a number of N, for example N=3, 4, 5 or 6, first tubular braces and a second set of N second tubular braces are provided in addition to a tower support, which will be used for carrying a wind turbine tower. These components are then assembled into a support structure.

Although, the assembly method is particularly useful for an offshore support structure with an offshore wind turbine, the generality of the method does not exclude that it may be used as a support structure for an offshore platform of another type, for example a floating platform.

In more detail, for each pair of one of the first braces and one of the second braces, the second end part of the first brace is connected to a first part of the tower support at a first connection, and the second end part of the second tubular brace is connected to a second part of the tower support at a second connection. Further, the first end part of the second brace is connected to the first brace at a third connection. The second connection is above the first connection when the support structure is oriented for operation, where the wind turbine tower is in vertical orientation. Accordingly, the tower support, the first brace, and the second brace form a triangle in a vertical plane. The N pairs of braces are directed outwards from the tower support in different directions about a vertical central axis of the tower support.

For the assembly, the first connections are provided as pivotal connections for pivoting the first braces relatively to the tower support in a vertical plane.

Various specific embodiments are possible.

In a first embodiment, each of the first braces is provided with brace cavity at the third connections. Each brace cavity is dimensioned to receive a first end part of one of the second braces. For the assembly, the first end part of the second brace is oriented towards the brace cavity and, then, the first end part of the first brace is lifted upwards to reduce the distance between the brace cavity and the first end part of the second brace. Due to the continued lifting of the first end part of the first brace, the first end part of the second brace is received in the brace cavity. Optionally, the second connection is a hinged connection between the tower support and the second brace. Advantageously, the hinged connection comprises a hinge with a horizontal axle for pivoting the second brace in a vertical plane, the vertical plane for each pair of braces containing a central axis of the tower support, a central axis of the first brace, and a central axis of the second brace.

In a second embodiment, the tower support has tower cavities at the second connections. Each tower cavity is dimensioned to receive a second end part of one of the second braces. For each second brace, the second end part is oriented towards the tower cavity in the tower support and, then, the first end part of the first brace is lifted upwards to reduce the distance between the tower cavity and the second end part of the second brace. Due to the continued lifting of the first end part of the first brace, also the second brace is lifted, and the second end part of the second brace is received in the tower cavity. Optionally, the third connection is a hinged connection between the first brace and the second brace. Advantageously, the hinged connection comprises a hinge with a horizontal axle for pivoting the second brace in a vertical plane, the vertical plane for each pair of braces containing a central axis of the tower support, a central axis of the first brace, and a central axis of the second brace.

After having received an end part deep enough in the corresponding cavity, the lifting of the first end part of the first brace is stopped, and the second brace is fixed in the cavity into a rigid structure by solidifying hardening casting material, for example grout, in the cavities.

For example, the casting material is only injected into the cavity after the receiving the respective end part in the cavity.

Optionally, the first connection between the tower support and the first brace is a hinged connection with a hinge having a horizontal axle for pivoting the second brace in a vertical plane, the vertical plane for each pair of braces containing a central axis of the tower support, a central axis of the first brace, and a central axis of the second brace.

As an alternative to the first connection being a hinged connection, the following applies. In this case, the tower support has N further tower cavities at first connections at various angular positions about the central axis and into which the second ends of the first braces are inserted and fixed into a rigid structure by solidifying hardening casting material in the further tower cavities.

The casting material is fluidic or semi-fluidic, for example polymer, concrete, or grout, which is then hardened to provide the solidified rigid casting. Grout is an exemplary material due to its high rigidity and longevity in saltwater. In the following, grout is exemplified as the casting material, but it could be substituted by another casting material, if it is more appropriate or useful.

The cavities are larger than the corresponding brace ends that they receive. This is not only advantageous in order to provide excess volume for sufficient grout inside the cavity between the brace end and the inner wall of the respective cavity but also for allowing the braces to change angle relative to the cavity during the assembly method. This latter aspect is unique relative to the prior art and necessary during the assembly presented herein because the method implies a lifting of the second ends of the first braces in order to adjust distances so that all the braces are inserted with correct distance into the corresponding cavities.

Flexibility between the tower support and the second end parts of the first braces is maintained during the lifting of the first ends of the first braces. During the lifting, the first braces are changing angle relative to the respective cavity. Although, grout could already be inserted in a semi-fluid state, still allowing angular adjustment of the first brace, typically, no grout is injected into the cavity at the first connection prior to lifting the first braces.

Once, the grout has hardened, lifting equipment, such as a crane, for lifting the braces can be removed from the now rigid structure.

For a bottom fixed support structure, the rigid frame structure with tower support and N first braces and N second braces is typically sufficient for long term stability. For floating structures, such as Tension Leg Platforms (TLP) for wind turbine towers or semisubmersible platforms, it is desirable to provide additional stability. For this reason, as an option, the following extended embodiment is useful.

In this extended embodiment, a third set of N third braces, typically tubular braces, are provided for interconnecting the first braces by the third braces. For example, the third braces are connected to the first braces in a subsequent step, optionally by a grouted connection, or alternatively by welding or by connection to corresponding brackets. As braces are typically and generally made of steel, welding is one of the available options. Bolting the third braces to the first braces is another option, for example by first welding brackets to the braces, which are then used for the bolt connection.

For example, for N=4, the first braces form a cross with the tower support in the center, and the third braces stabilize the cross in the plane formed by the cross. Typically, the third set of N=4 braces form a square in which the first braces form the diagonals. The first and third braces are optionally in a single plane. However, this is not strictly necessary. For example, the third braces form a square in one plane, and the first braces extend with their first end in the tower support out of such plane, for example below the plane of the square of the third braces. Furthermore, it is also not strictly necessary that the braces are equally long, and one or two of the first braces may be longer than the remaining two in order for the assembly of the N=4 third braces to deviate from a square and form a rectangle, instead.

Another example is for N=3, in which the third braces form a triangle, optionally with the tower in the center of the triangle. These third braces are also called side braces, as they form sides of a triangle. The first braces are also typically called radial braces, as they extend radially from the tower support to one of each of the corners in the triangle. Also, in this case, the first and third braces are optionally in a single horizontal plane. However, this is not strictly necessary. For example, the third braces form a triangle in one plane, and the first braces extend with their first end in the tower support out of such plane, for example below or above the horizontal plane of the triangle of the third braces. Furthermore, it is also not strictly necessary that the braces are equally long, forming an equilateral triangle, as the triangle need not necessarily be regular. Even further, it is possible that the tower support is not in the center of the triangle.

Optionally, the interconnection of the first braces by the third braces involves interconnecting the ends of the first braces by the third braces. However, this is not strictly necessary, as the connection can be a distance offset from the ends.

For the case N=3, the assembly may result in a tetrahedral structure formed by the first, second and third braces, optionally formed as a regular tetrahedron. In this case, the first braces are radial braces that extend radially from the tower support. The third braces are side braces, as they form sides of a triangle. The second braces are diagonal braces, as they extend diagonally from the first braces to the tower support, each second brace forming a vertical triangle with the first brace and the tower support.

For example, the columns support is centered in the tetrahedral structure. Alternatively, it is off-centered, or the tower support is provided in a corner of the super structure or along a side of a triangle between two nodes.

Once, the offshore support structure has been assembled, typically onshore or on land, a wind turbine is mounted on top of the structure. The assembly is then moved to a point of destination offshore, typically dragged along by vessels, and then anchored to the seabed, for example while maintaining the structure floating. As mentioned, examples are TLP, which typically are floating under water, and semisubmersibles, which are floating half submersed in the water at the surface.

In order to optimize strength and longevity of the grout connections, shear keys are advantageously used on the inserted portion of the braces.

The first and second braces are tubular, and typically also the third braces are tubular. Optionally, the tubular braces have volumes with positive buoyancy. Optionally, the volumes can be flooded for adjusting the buoyancy. In most general cases, the braces are straight.

For example, the end of the brace that is inserted into a receiving cavity is fitted with an end flange having a flange portion that extends laterally outwards or laterally inwards, which is typically called an outwards or inward directed L-flange, due to the end of the brace in cross section resembling the letter L. Alternatively, the end portion extends both laterally inwards and outwards, which is typically called a T-flange, due to the end of the brace in cross section resembling the letter T. Alternative or additional shear keys and/or reinforcement bars are used for achieving a rigid long-lasting connection even under stressed conditions in rough sea.

As an example, braces optionally have a diameter in the range of 1 to 6 meters, the larger of which can be more than 50 meters long. Brace ends are optionally inserted a distance of 3 to 5 meters in the respective cavity.

Optionally, the tower support itself is tubular, for example cylindrical or conical or a combination thereof in adjacent sections of the tubular support structure.

BRIEF DESCRIPTION OF THE DRAWINGS

The systems and methods will be explained in more detail with reference to the drawings, where.

DETAILED DESCRIPTION

Figure 1:
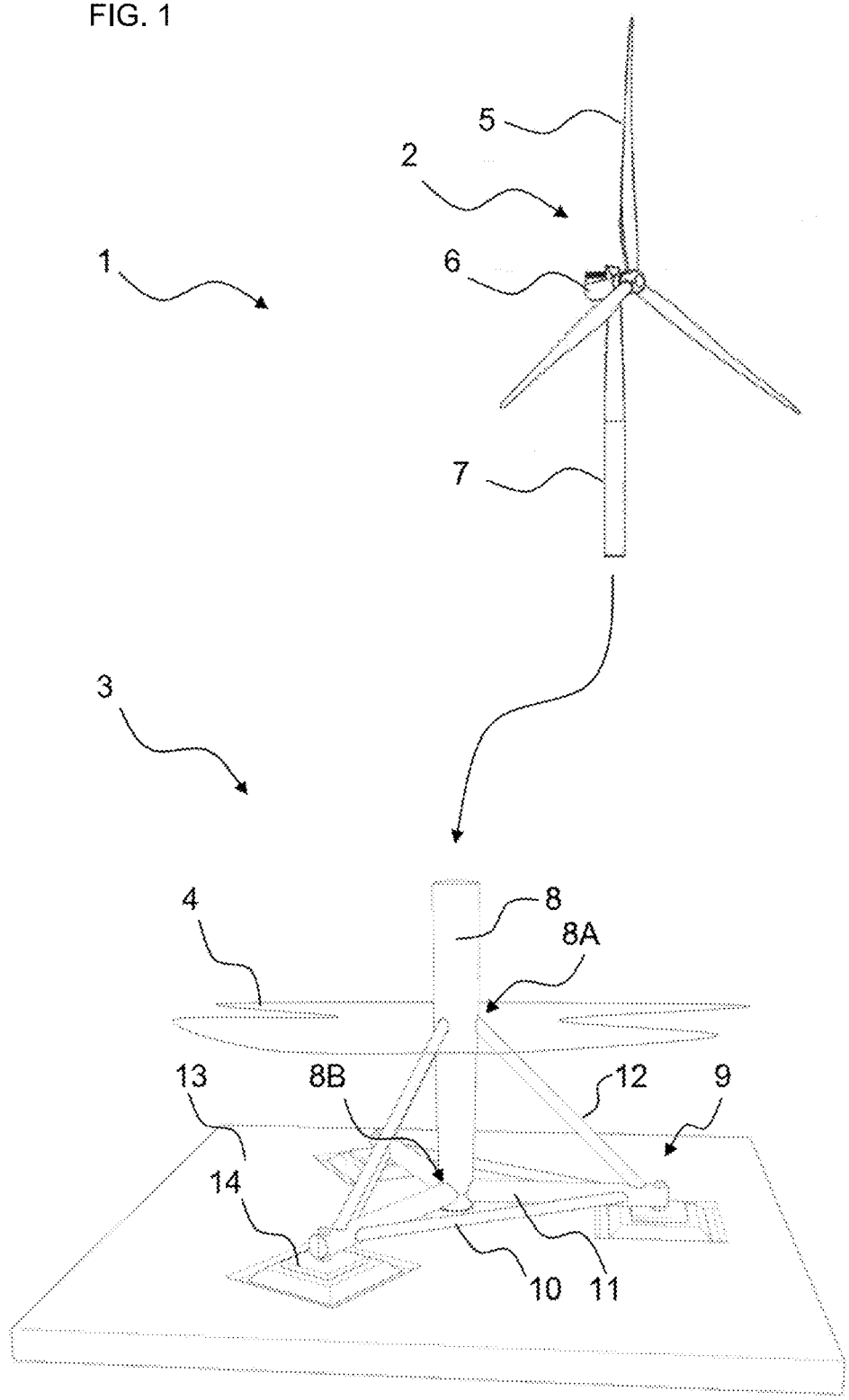
FIG. 1 discloses a tetrahedral structure for an offshore wind turbine.

FIG. 1 illustrates an offshore wind turbine installation 1. The installation 1 comprises a wind turbine 2 and an offshore support structure 3, on which the wind turbine 2 is mounted for operation and by which it is supported in offshore conditions. The wind turbine 2 comprises a rotor 5 and a tower 7 and nacelle 6 that connects the rotor 5 with the tower 7. The offshore support structure 3 comprises a tower support 8, onto which the tower 7 of the wind turbine 2 is mounted.

Notice that the wind turbine 2 is not to scale with the support structure 3 but is shown at smaller scale for ease of illustration.

The offshore support structure 3 is exemplified as a bottom supported structure with feet 14 embedded in the seabed 13 under the water surface 4. Such type of offshore support structure 3 is used in shallow waters. Typically, for deeper waters, floating structures are used, for example semisubmersible structures with mooring lines and buoyancy tanks that keep the structure 3 floating half-way submersed under water. In such case, the buoyancy tanks would be mounted at the nodes 9 of the structure 3 instead of the feet 14, unless the tubular structure itself provides sufficiently buoyancy. Alternatively, the structure 3 could be a tension leg platform (TLP) with a fully submerged floating support structure.

The exemplified structure 3 has a tetrahedral shape where the triangular base is formed by side braces 10 and radial braces 11. The side braces 10 form a triangle by interconnection through the radial braces 11. The radial braces 11 connect to the tower support 8. The tower support 8 is exemplified as a support column but could have other shapes than illustrated. As illustrated, the tower support 8 extends to a position above the water surface 4.

In order to provide increased mechanical stability between the support column 8 and the triangular base, formed by the side braces 10 and the radial braces 11, there are provided diagonal braces 12, which extend from the radial braces 11 and which extend to the support column 8 at an upper position 8A, which is above the lower position 8B where the radial braces 11 connect to the tower support 8. As illustrated, the braces 10, 11, 12 and the tower support 8 form a tetrahedron.

As will be exemplified later in more detail, the connections between the braces 10, 11, 12 and the tower support 8 can be casted connections, for example grouted connections, where an end part of a brace is accommodated in a cavity of another brace and/or in a cavity of the tower support, which is then filled with a casting material, typically grout, which is then hardened to provide a solidly fixed connection. Examples of casted connections between the diagonal brace 12 and the radial brace are described in more detail with reference to the corresponding illustrations in the following.

Figure 2:
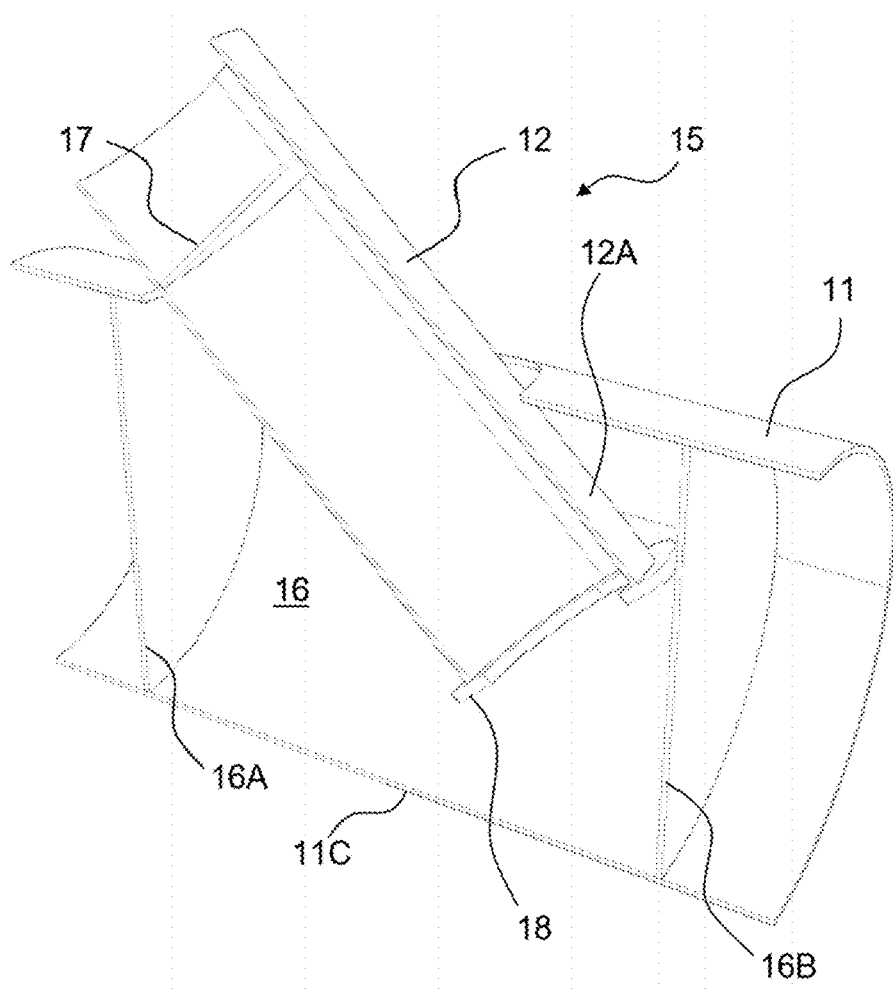
FIG. 2 illustrates a connection between two braces, according to an embodiment.

FIG. 2 illustrates a casted connection 15, for example grouted connection, between an end part 12A of a diagonal brace 12, where the end part 12A is inserted into a receiving cavity 16 of a radial brace 11. After insertion of the end part 12A into the cavity 16, the cavity 16 is filled with the casting material, for example concrete or grout. In this case, the cavity 16 is defined by the cylindrical wall 11A of the radial brace 11 and the separating cavity walls 16A, 16B in the radial brace 11. For increased connection strength, not only the cavity 16 is filled with the casting material, for example grout, but also the end part 12A up to a separator 17 inside the diagonal brace 12. For additional strength, a laterally inwards and laterally outwards extending end-flange 18, forming a cross sectional shape of a circumvented letter T, is provided at the very end of the end part 12A. The flange 18 could have other shapes, for example only extending radially outwards and forming a letter L in cross section.

Figure 3:
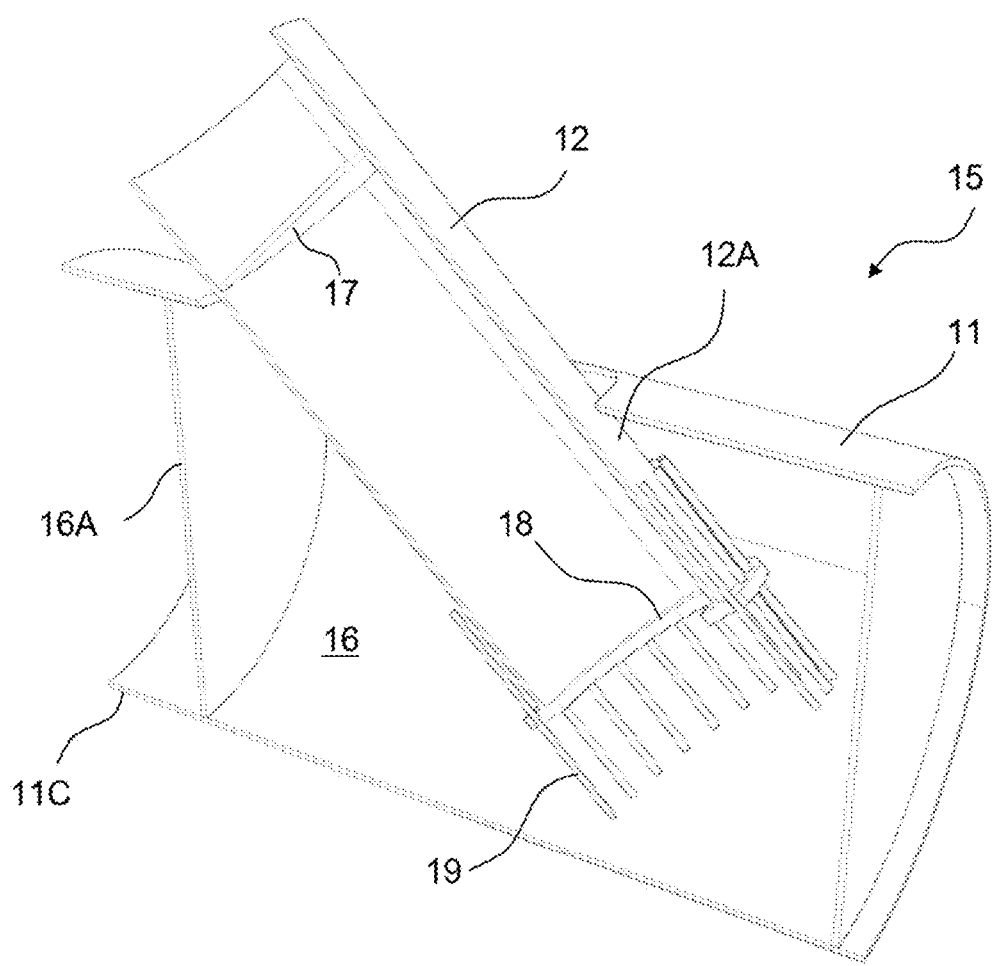
FIG. 3 illustrates an alternative connection between two braces, according to an embodiment.

FIG. 3 illustrates an end part 12A that has an end flange 18 fitted with reinforcement bars 19 for forming a reinforced casted joint, for example a grouted joint. The end-part 12A that is inserted into the cavity 16 of the radial brace 11 has an end flange 18 through which multiple reinforcement bars 19 extend inside the cavity 16. Whereas the end flange 18 increases the stability of the grouted connection in the axial direction, the bars 19 increase the stability in the rotational direction about the central axis of the diagonal brace 11. As illustrated, the multiple reinforcement bars 19 project beyond the end flange 18 further into the receiving cavity 16 in the radial brace 11.

Figure 4:
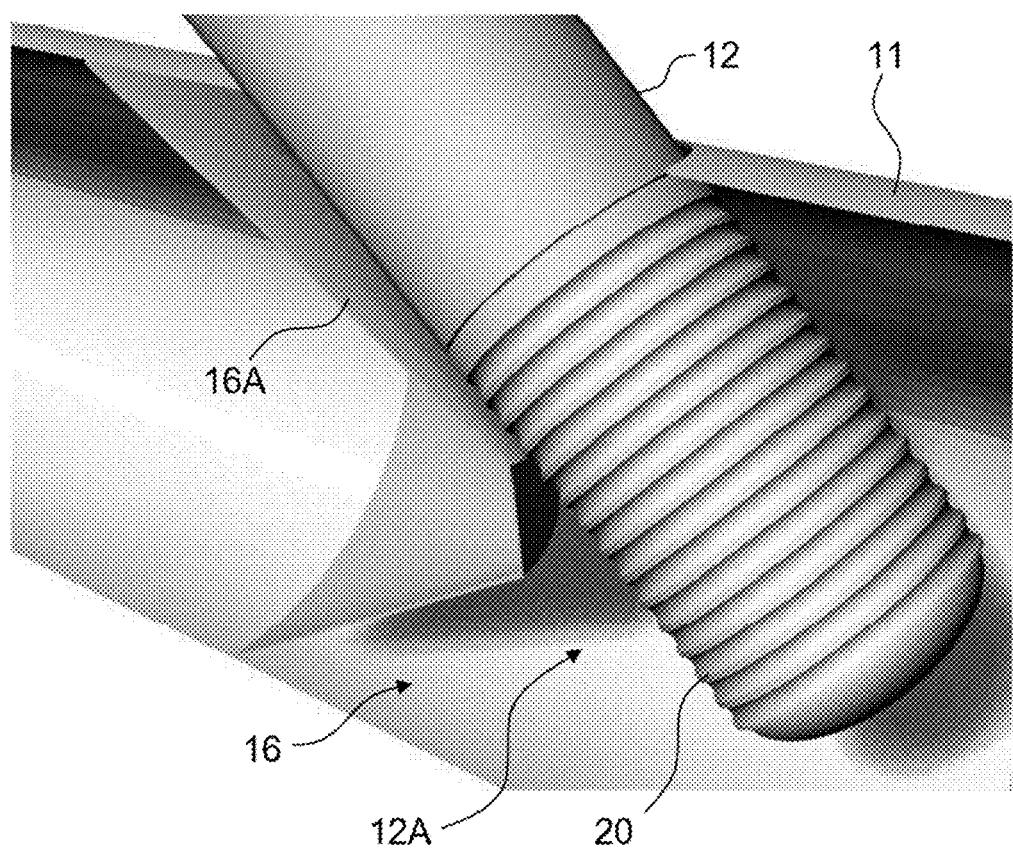
FIG. 4 illustrates a further alternative connection between two braces, according to an embodiment.

FIG. 4 illustrates an alternative casted connection, for example grouted connection. The inserted end part 12A comprises sheer keys 20 as a measure for securing enhanced stability of the connection. The cavity wall 16A has a tapering shape towards the end part 12A of the diagonal brace 12. This tapering shape results in a reduced cavity volume, and may assist in directing the end part 12A into the cavity 16.

Figure 5A:
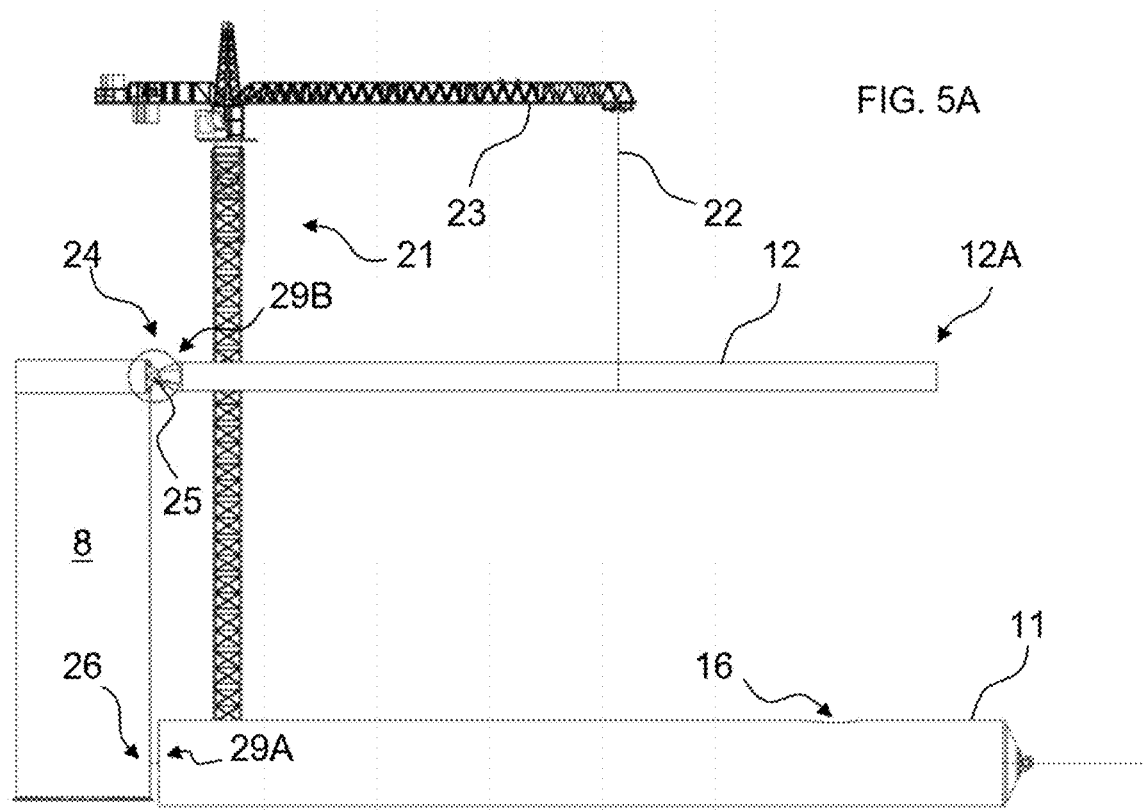
FIGS. 5A, 5B, 5C and 5D illustrate a first assembly procedure, according to an embodiment.
Figure 5B:
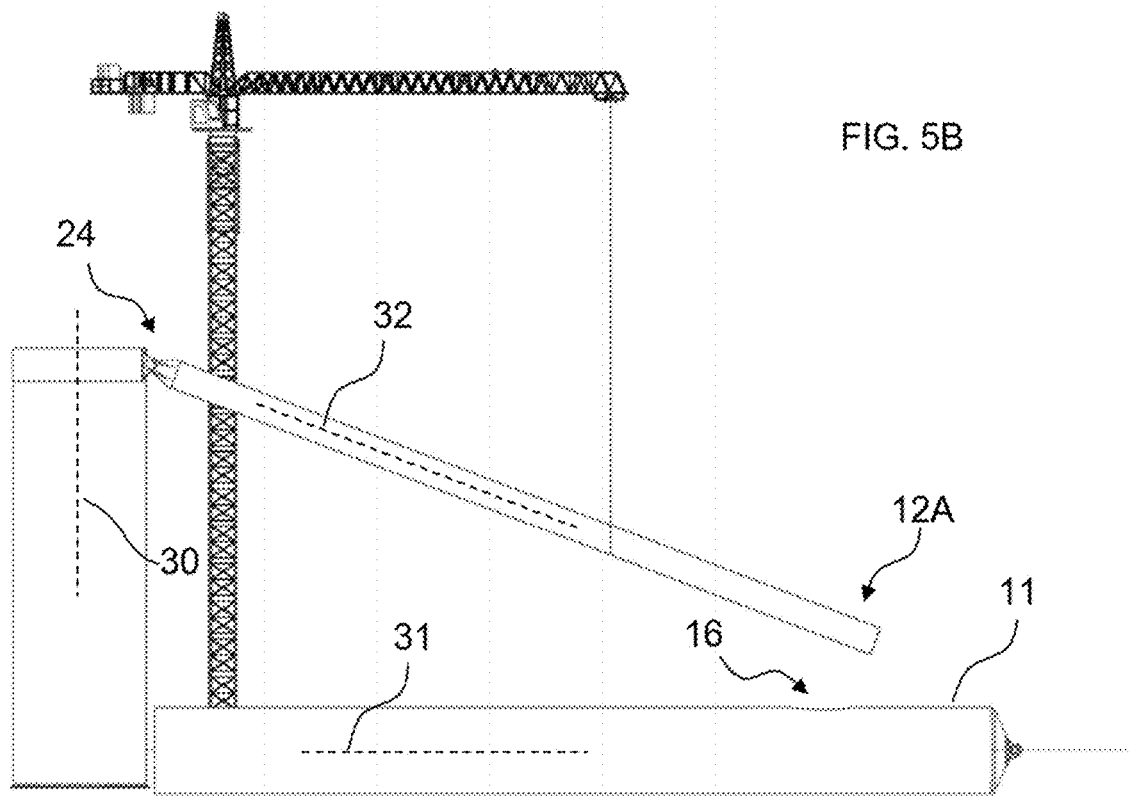

FIG. 5A and FIG. 5B illustrate a first embodiment of an assembly procedure. The diagonal brace 12 in FIG. 5A is not yet diagonal but held in horizontal orientation by a wire 22 from an arm 23 of a crane. The diagonal brace 12 is rotationally fixed to the tower support 8 by a hinge 24. The hinge 24 has a rotational axle 25 that is horizontal, so that the rotational movement of the diagonal brace 12 is limited to a rotation in a vertical plane, the vertical plane containing the central axis of the tower support 8, the central axis of the diagonal brace 12 and the central axis of the radial brace 11. When the end part 12A of the diagonal brace 12 is lowered by extension of the wire 22 from the crane arm, as illustrated in FIG. 5B, the end part 12A approaches the cavity 16 in the radial brace 11.

Figure 5C:
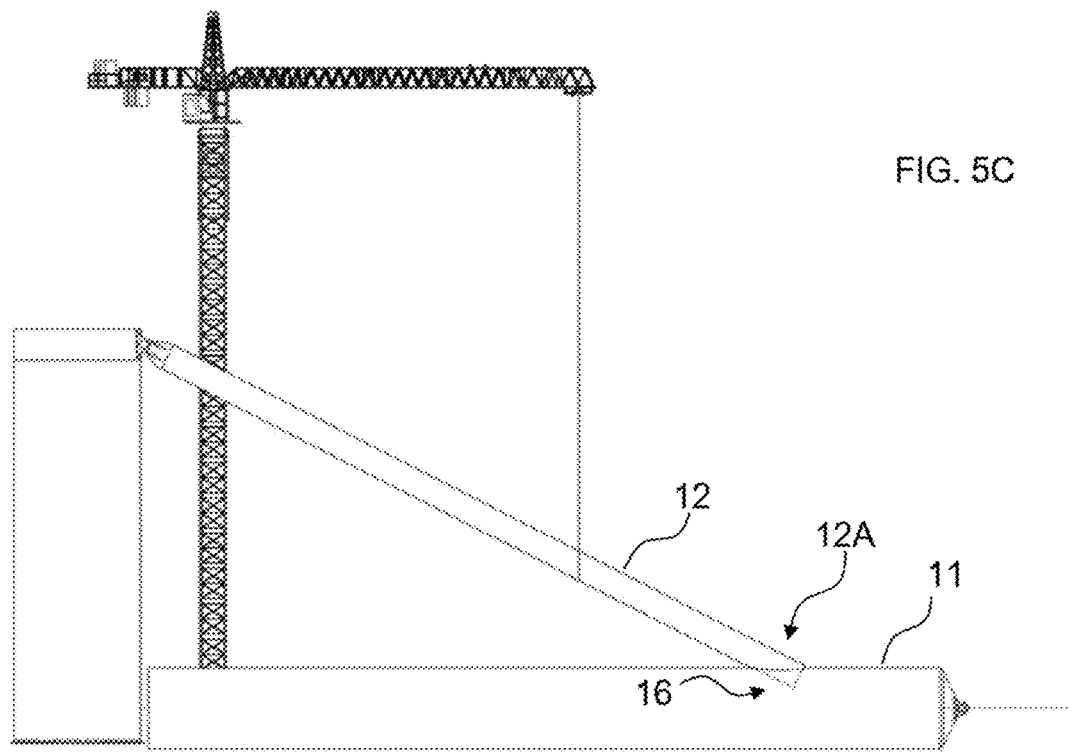

As illustrated in FIG. 5C, the end part 12A of the diagonal brace 12 is lowered until it enters the cavity 16 of the radial brace 11.

Figure 5D:
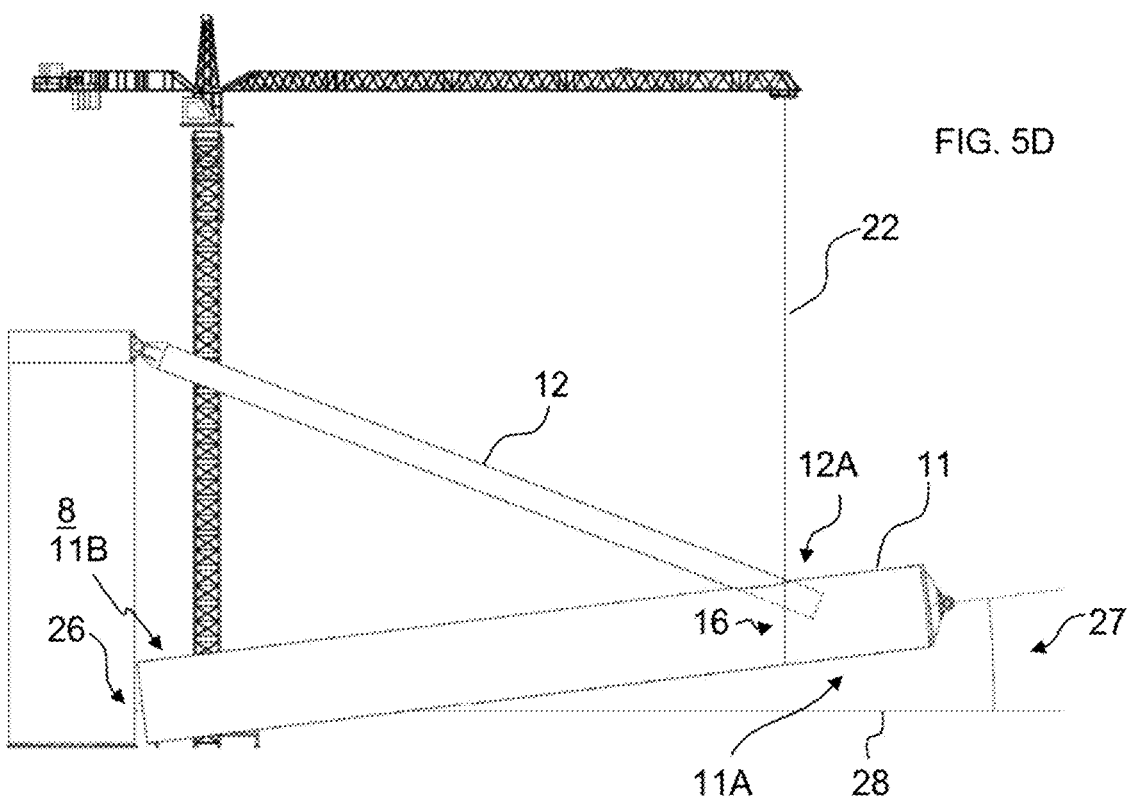

While the end part 12A of the diagonal brace 12 is resting on or in the cavity 16 of the radial brace 11, the wire 22 of the crane is detached from the diagonal brace 12 and attached to the radial brace 11 for lifting an outer end part 11A of the radial brace 11, as illustrated in FIG. 5D. As the opposite, inner end part 11B of the radial brace 11 is rotationally fixed to the tower support 8 by a further hinge 26, optionally in structure and/or function similarly to the hinge 24 of the diagonal brace 12, the radial brace 11 attains an angled orientation relatively to the starting orientation with an inclination 27 relative to the horizontal direction 28.

Due to the lifting of the outer end part 11A of the radial brace 11, the end part 12A of the diagonal brace 12 is pushed into the cavity 16 of the radial brace 11. Once, sufficiently inserted into the cavity 16, the end part 12A of the diagonal brace 12 is fixed inside the cavity 16 by a casted connection where grout or other hardening casting material is inserted into the cavity 16. After hardening of the casting material, the wire 22 is demounted, as the connection is now sufficiently stable to maintain its triangular shape formed by the tower support 8, the diagonal brace 12, and the radial brace 11. For a tetrahedral structure, all three diagonal braces 12 are correspondingly inserted with their end part 12A into one of such cavities 16 in each of the three radial braces 11.

Optionally, the plurality of diagonal braces 12 are all arranged towards the cavities 16 of the corresponding radial braces 11, after which all radial braces 11 are lifted together, in order for the cavities 16 to take up the corresponding end parts 12A of the plurality of diagonal braces 12, simultaneously.

The braces are tubular in the shown embodiments. FIG. 5B also shows the central axis 30 of the tower support 8, the central axis 31 of the first brace 11, and the central axis 32 of the second brace 12.

Figure 6A:
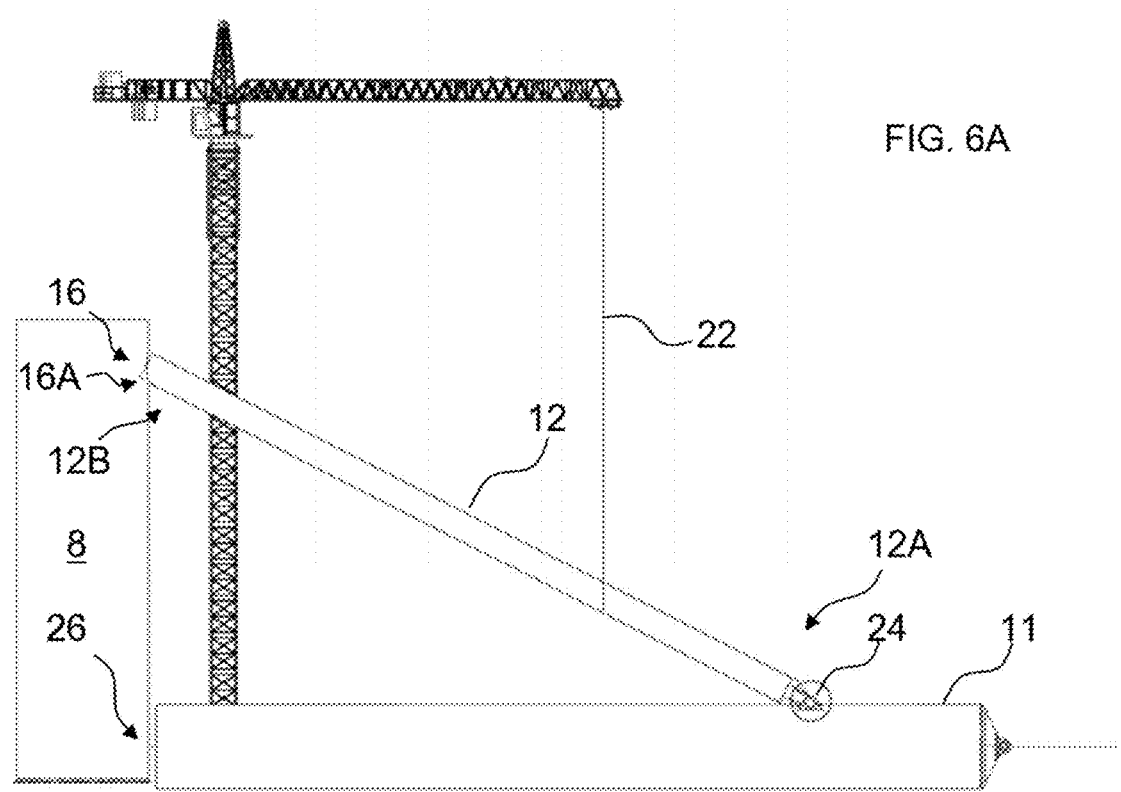
FIGS. 6A and 6B illustrate a second assembly procedure, according to an embodiment.
Figure 6B:
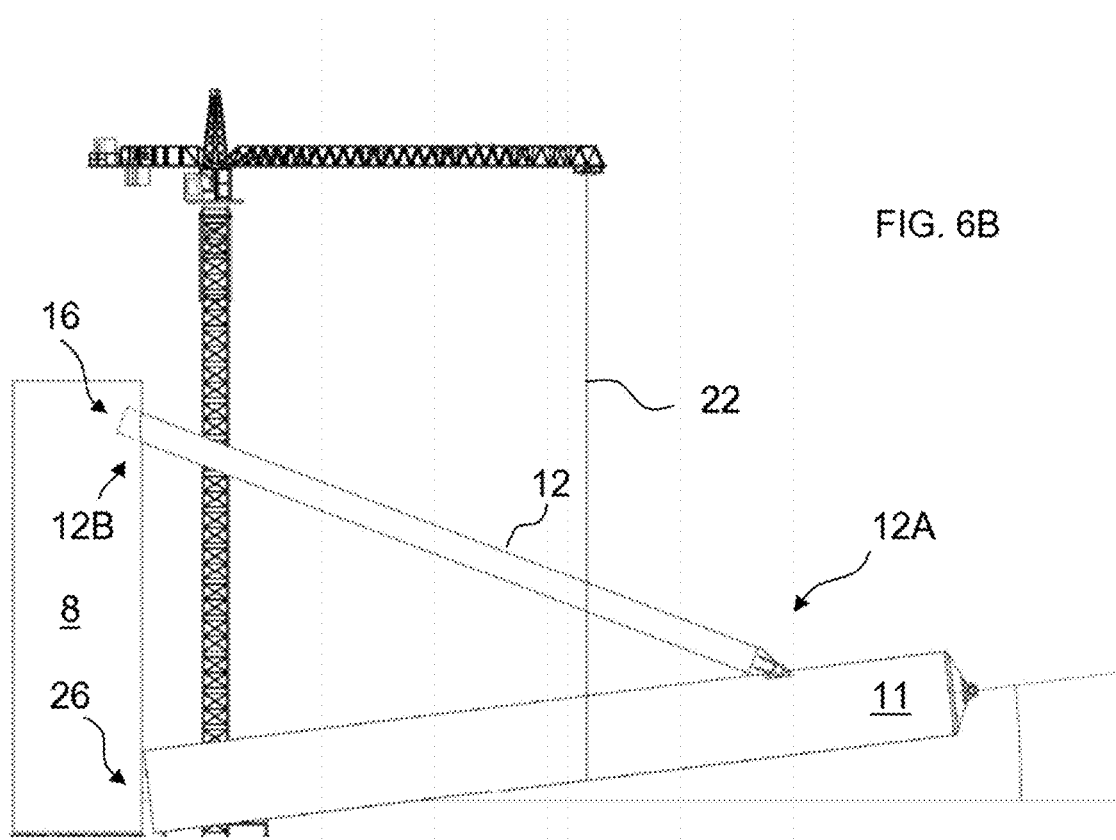

FIG. 6A and FIG. 6B illustrate a circumvented principle, in which the diagonal brace 12 is hinged with a hinge 24 on an upper side of the radial brace 11. Similar to the principle in FIG. 5, the radial brace 11 is hinged in a hinge 26, which allows movement only in a vertical plane, typically, containing the central axis of the tower support 8, the central axis of the diagonal brace 12 and the central axis of the radial brace 11. In this embodiment, the wire 22 of the crane is used to hold the diagonal brace 12 in an orientation in which the end 12B of the diagonal brace 12 is oriented towards a cavity 16 in the tower support 8. For the correct orientation, as exemplified in FIG. 6A, the end part 12B of the diagonal brace 12 is resting on an edge 16A of the cavity 16, so that the wire 22 can be released from the diagonal brace 12, without the diagonal brace 12 sliding out of position. Then, the wire 22 is shifted from the diagonal brace 12 to the radial brace 11, the end first part 11A of which is then lifted so that the end part 12B of the diagonal brace 12 is pushed into the cavity 16. Once, the end part 12B of the diagonal brace 12 is fixed inside the cavity 16 of the tower support 8 by the casting material, such as grout, the crane wire 22 is removed.

Figure 7A:
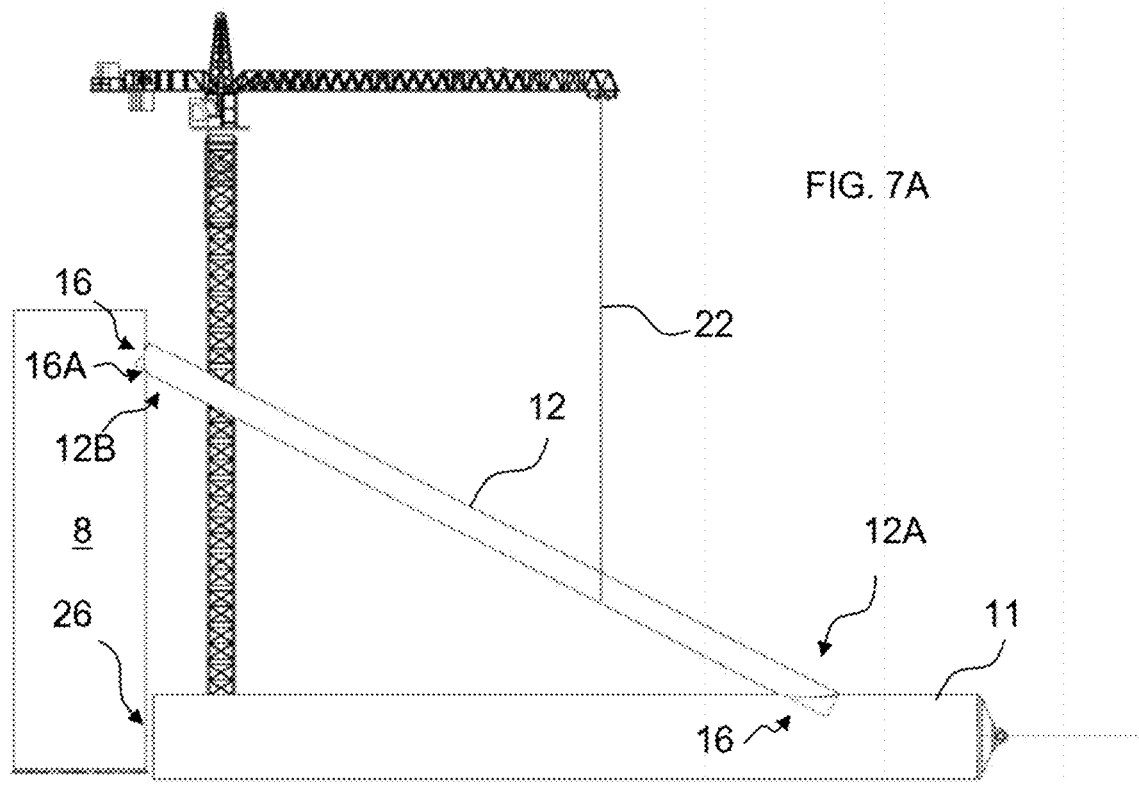
FIGS. 7A and 7B illustrate a third assembly procedure, according to an embodiment.
Figure 7B:
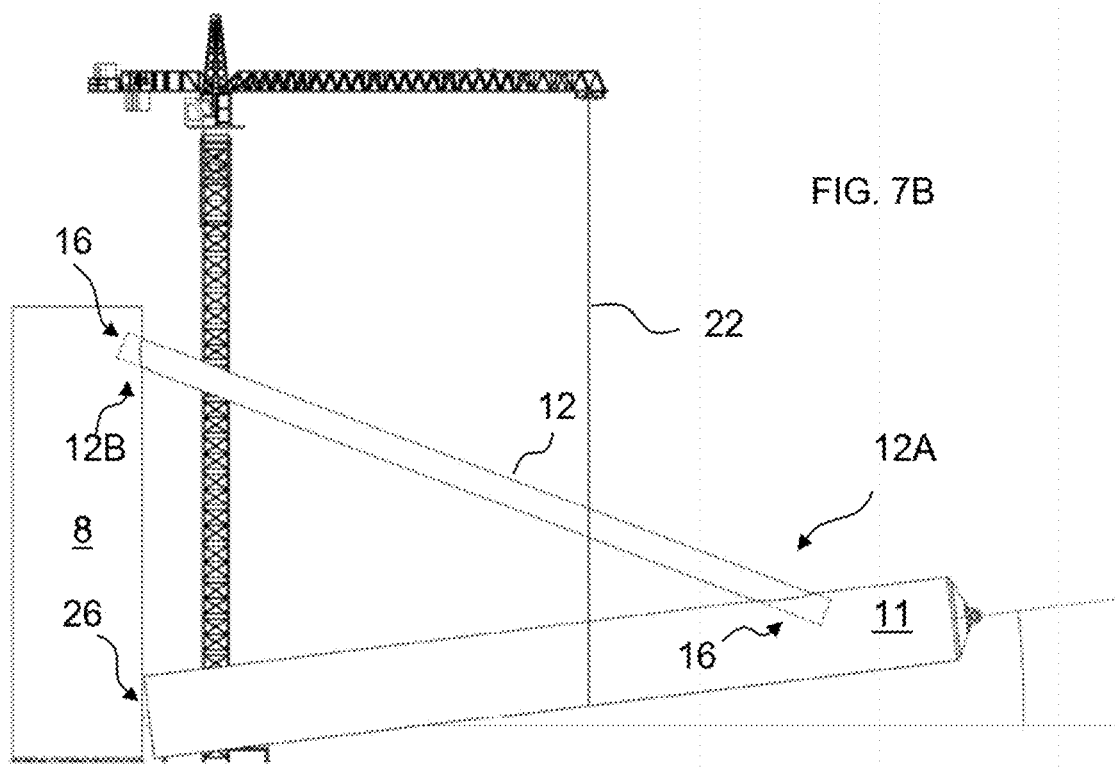

FIG. 7A and FIG. 7B illustrate a principle in which both end parts 12A, 12B of the diagonal brace 12 are fixed into corresponding cavities 16 in the radial brace 11 and in the tower support 8, respectively. In this procedure, the first end part 12A of the diagonal brace 12 is inserted into the cavity of the radial brace 11, and the wire 22 of the crane is used to hold the diagonal brace 12 in an orientation in which the opposite, second end part 12B of the diagonal brace 12 is oriented towards a cavity 16 in the tower support 8. For the correct orientation, as exemplified in FIG. 7A, the second end part 12B of the diagonal brace 12 is resting on an edge 16A of the cavity 16 in the tower support 8, so that the wire 22 can be released from the diagonal brace 12, without the diagonal brace 12 sliding out of position. Then, the wire 22 is shifted from the diagonal brace 12 to the radial brace 11, the end part 11A of which is then lifted so that the second end part 12B of the diagonal brace 12 is pushed into the cavity 16 of the tower support 8. Once, the casting materials in the cavities 16 harden, and first end part 12A is fixed in the cavity 16 of the radial brace 11 and the second end part 12B inside the cavity 16 of tower support 8, the structure is stable, and the crane wire 22 is removed.

Figure 8A:
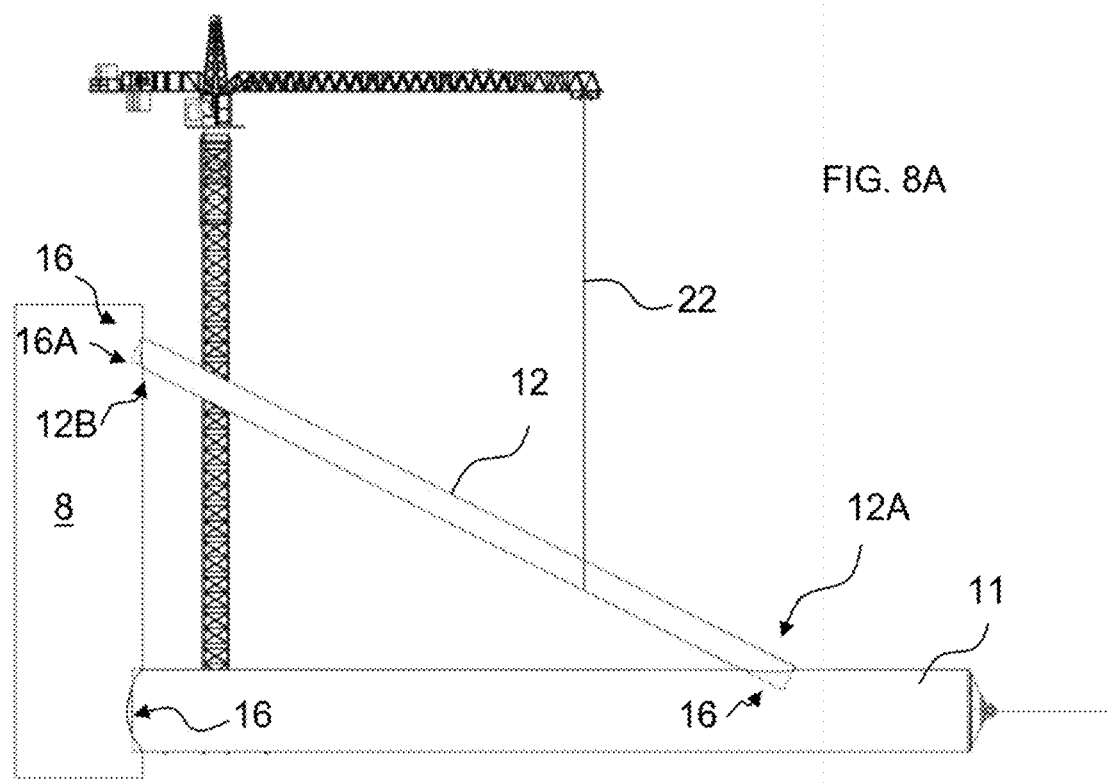
FIGS. 8A and 8B illustrate a fourth assembly procedure, according to an embodiment.
Figure 8B:
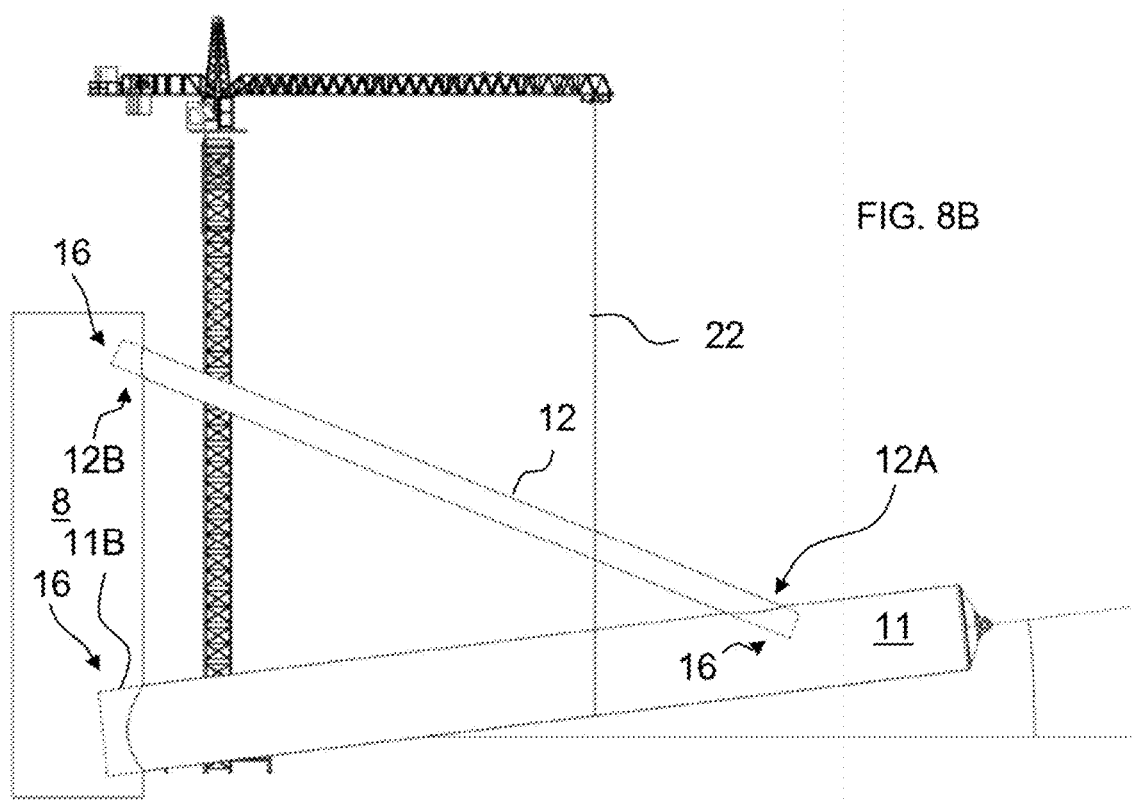

FIG. 8A and FIG. 8B illustrate a principle in which both end parts 12A, 12B of the diagonal brace 12 are fixed in corresponding cavities 16 in the radial brace 11 and in the tower support 8, respectively, and in which the inner end 11B of the radial brace 11 is fixed in a further cavity 16 in the tower support 8. In this procedure, the first end part 12A of the diagonal brace 12 is inserted into the cavity 16 of the radial brace 11, and the wire 22 of the crane is used to hold the diagonal brace 12 in an orientation in which the second end 12B of the diagonal brace 12 is oriented towards an upper cavity 16 in the tower support 8. For the correct orientation, as exemplified in FIG. 8A, the second end part 12B of the diagonal brace 12 is resting on an edge 16A of the cavity 16 in the tower support 8, so that the wire 22 can be released from the diagonal brace 12, without the diagonal brace 12 sliding out of position. Then, the wire 22 is shifted from the diagonal brace 12 to the radial brace 11, the end part 11A of which is then lifted so that the second end part 12B of the diagonal brace 12 is pushed into the cavity 16 of the tower support 8. At the same time, the radial brace 11 is sliding into a lower cavity 16 of the tower support 8, so that the triangle formed by the tower support 8, the radial brace 11, and the diagonal brace 12 at its corners comprises cavities 16 in which the braces 11, 12 and the tower support 8 are connected. Once, the casting materials in the three cavities 16 harden, the first end part 12A is fixed in the cavity 16 of the radial brace 11, the second end part 12B of the diagonal brace 12 is fixed inside the upper cavity 16 of tower support 8, and the inner end 11B of the radial brace 11 is fixed inside the lower cavity of the tower support 8, the structure is stable, and the crane wire 22 is removed.

As exemplified, in FIGS. 8A and 8B, all three connections are formed by cavities, whereas the first connection at the lower tower support 8 is hinged in FIG. 7B, the second connection at the upper tower support 8 is hinged in FIG. 5D, and the third connection at the distal radial brace 11 is hinged in FIG. 6A.

Although, the procedure has been exemplified for a triangular, especially, tetrahedral structure, it is also applicable for other polygonal structures, for example having 4, 5 or 6 radial braces 11 and a corresponding number of diagonal braces 12.

As a typical option, in order to end with a structure as illustrated in FIG. 1, side braces 10 are connected to the radial braces 11, which enhances rigidity.

What is claimed is:

1. A method for assembling an offshore support structure for a wind turbine, the method comprising:
    providing a tower support for carrying a wind turbine tower;
    providing N first braces and N second braces, wherein N is an integer having a value of at least three, each brace having a first end part and a second end part; wherein each of the braces has a longitudinal central axis;
        for each pair of one of the first braces and one of the second braces, connecting the second end part of the first brace to a first part of the tower support at a first connection, and connecting the second end part of the second brace to a second part of the tower support at a second connection, and connecting the first end part of the second brace to the first brace at a third connection, wherein the second part of the tower support and the second connection are above the first part of the tower support and the first connection when the support structure is oriented for offshore operation, and wherein the tower support, the first brace, and the second brace form a triangle in a vertical plane, and wherein the N pairs of braces are directed outwards from the tower support in different directions about a vertical central axis of the tower support;
    providing the first connections as pivotal connections for pivoting the first braces relatively to the tower support in a vertical plane; and
        (A) providing each of the first braces with a brace cavity at the third connection, each brace cavity being dimensioned to receive a first end part of one of the second braces, orienting the first end part of the second brace towards the brace cavity, then lifting the first end part of the first brace to reduce a distance between the brace cavity and the first end part of the second brace, and due to continued lifting of the first end part of the first brace receiving the first end part of the second brace in the brace cavity, then, stopping the lifting of the first end part of the first brace and fixing the second brace in the brace cavity into a rigid structure by solidifying hardening casting material in the brace cavity; or
        (B) providing the tower support with tower cavities at the second connections, each tower cavity being dimensioned to receive a second end part of one of the second braces, orienting the second end part towards the tower cavity in the tower support, then lifting the first end part of the first brace to also lift the second brace and reduce a distance between the tower cavity and the second end part of the second brace, and due to continued lifting of the first end part of the first brace receiving the second end part of the second brace in the tower cavity, then stopping the lifting of the first end part of the first brace and fixing the second brace in the tower cavity into a rigid structure by solidifying hardening casting material in the tower cavity.

2. The method according to claim 1, wherein (A) further comprises providing the second connection as a hinged connection between the tower support and the second brace, the hinged connection comprising a hinge with a horizontal axle for pivoting the second brace in a vertical plane, the vertical plane for each pair of braces, containing a central axis of the tower support, a central axis of the first brace, and a central axis of the second brace.

3. The method according to claim 1, wherein (B) further comprises providing the third connection as a hinged connection between the first brace and the second brace, the hinged connection comprising a hinge with a horizontal axle for pivoting the second brace in a vertical plane, the vertical plane for each pair of braces, containing a central axis of the tower support, a central axis of the first brace, and a central axis of the second brace.

4. The method according to claim 1, further comprising providing the tower support with N further tower cavities at the first connections and inserting the second ends of the first braces into the further tower cavities, and fixing the second ends of the first braces in the further tower cavities at the first connections into a rigid structure by solidifying hardening casting material in the further tower cavities.

5. The method according to claim 1, further comprising providing the first connections between the tower support and the first braces as hinged connections, each with a hinge having a horizontal axle for pivoting the first brace in a vertical plane, the vertical plane for each pair of braces containing a central axis of the tower support, a central axis of the first brace, and a central axis of the second brace.

6. The method according to claim 1, further comprising providing a third set of N third braces and interconnecting the first braces by the third braces for increasing rigidity between the first braces.

7. The method according to claim 6, wherein N is 3, and wherein the third braces form a triangular structure.

8. The method according to claim 7, further comprising forming a tetrahedral structure by the first braces, the second braces and the third braces.

9. The method according to claim 8, further comprising forming the tetrahedral structure as a regular tetrahedron with the tower support centered in the tetrahedral structure.

10. The method according to claim 1, wherein the casting material is grout.

11. The method according to claim 1, further comprising assembling the offshore support structure onshore and providing a wind turbine on top of the offshore support structure, then, moving the offshore support structure to an offshore point of destination and anchoring the offshore support structure to a seabed.

\* \* \* \* \*